United States Patent
Lu et al.

(10) Patent No.: US 11,463,201 B2
(45) Date of Patent: Oct. 4, 2022

(54) HARQ TXOP FRAME EXCHANGE FOR HARQ RETRANSMISSION USING HARQ THREADS

(71) Applicant: MediaTek Singapore Pte. Ltd., Singapore (SG)

(72) Inventors: Kaiying Lu, San Jose, CA (US); Jianhan Liu, San Jose, CA (US); James Chih-Shi Yee, San Jose, CA (US); Chao-Chun Wang, San Jose, CA (US); Thomas Edward Pare, Jr., San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 134 days.

(21) Appl. No.: 16/909,911

(22) Filed: Jun. 23, 2020

(65) Prior Publication Data
US 2020/0412496 A1    Dec. 31, 2020

Related U.S. Application Data

(60) Provisional application No. 62/866,706, filed on Jun. 26, 2019.

(51) Int. Cl.
*H04L 1/18* (2006.01)
*H04L 1/08* (2006.01)
*H04L 1/16* (2006.01)

(52) U.S. Cl.
CPC ............. *H04L 1/1812* (2013.01); *H04L 1/08* (2013.01); *H04L 1/1614* (2013.01); *H04L 1/1678* (2013.01); *H04L 1/1867* (2013.01)

(58) Field of Classification Search
CPC ... H04L 1/1867; H04L 1/1822; H04L 1/1812; H04L 1/1614; H04L 1/1678
See application file for complete search history.

(56) References Cited

U.S. PATENT DOCUMENTS

| | | | | |
|---|---|---|---|---|
| 2017/0126363 | A1* | 5/2017 | Wang | H04L 1/1671 |
| 2020/0412491 | A1* | 12/2020 | Lu | H04L 1/1621 |
| 2021/0045009 | A1* | 2/2021 | Chun | H04L 1/1812 |
| 2021/0250133 | A1* | 8/2021 | Chun | H04L 1/0003 |
| 2021/0266204 | A1* | 8/2021 | Chen | H04L 25/03866 |

(Continued)

FOREIGN PATENT DOCUMENTS

| | | |
|---|---|---|
| WO | 2015006640 A1 | 1/2015 |
| WO | 2019103452 A1 | 5/2019 |

*Primary Examiner* — Min Jung

(57) ABSTRACT

Embodiments described herein provide apparatus and methods for performing HARQ operations using parallel HARQ threads, where each new transmission of a Media Access Control (MAC) Protocol Data Unit (MPDU)/Aggregate-MPDU (A-MPDU)/Physical Layer Convergence Procedure (PLCP) Service Data Unit (PSDU) triggers the activation of a HARQ thread. Each HARQ thread contains one or more HARQ coding words or coding units. A HARQ thread index is setup by a transmission opportunity (TXOP) holder for a corresponding PSDU and is used to identify HARQ threads. Transmission information such as duration in formation for PPDUs including BA/HARQ-ACK feedback such as RX/TX addresses, etc. can be determined according to previous transmission values of a received PPDU (e.g., values of a MAC or PHY header).

15 Claims, 15 Drawing Sheets

(56) References Cited

U.S. PATENT DOCUMENTS

2021/0298076 A1* 9/2021 Kim .................. H04W 74/0808
2021/0336719 A1* 10/2021 Xin ....................... H04L 1/1614
2021/0399838 A1* 12/2021 Lou ....................... H04L 1/1848

* cited by examiner

HARQ TXOP FRAME EXCHANGE FOR HARQ RETRANSMISSION USING HARQ THREADS

CROSS-REFERENCE TO RELATED APPLICATIONS

This application claims the benefit of and priority to provisional patent application Ser. No. 62/866,706, Attorney Docket Number 251359-8715, with filing date Jun. 26, 2019, by Kai Ying Lu, et al., which is hereby incorporated by reference in its entirety.

FIELD

Embodiments of the present invention generally relate to the field of wireless communications. More specifically, embodiments of the present invention relate to systems and methods for error correction and control of transmissions within a wireless communication network.

BACKGROUND

Modern electronic devices typically send and receive data with other electronic devices wirelessly using Wi-Fi, and often data that is sent by a transmitter to a receiver is lost or corrupted. This can be due to interference from other electronic device, or other common issues with wireless transmission of data, such as weather or obstructions that physically block the wireless signal. For these reasons, several techniques for retransmitting data have been developed so that data intended for the receiver can be delivered successfully, even if retransmission is required.

Two common techniques for retransmitting data are Automatic Repeat Request (ARQ) and Forward Error Coding (FEC). ARQ is a technique that requires the receiver to send an acknowledgement ("ACK") packet when data has been received successfully. If the data is not delivered successfully or delivered with an error, no ACK is sent to the transmitter. In this case, when the transmitter does not receive an ACK, the data is retransmitted. While this approach leads to very high reliability when transmitting data, sending an ACK for every data packet that is successfully received leads to decreased data throughput when errors occur frequently in the channel.

FEC is a technique that allows a receiver to correct errors in the transmission using error coding procedures and metadata. For instance, data can be sent with a cyclic redundancy check (CRC) digest. FEC reduces errors and only moderately decreases throughput. However, the use of FEC does not lead to high reliability, as some errors may not be corrected using the error coding.

Hybrid automatic repeat request (hybrid ARQ or HARQ) combines high-rate forward error-correcting coding and ARQ error-control. In standard ARQ, redundant bits are added to data to be transmitted based on an error-detecting (ED) code such as a CRC as referred to above. Receivers detecting a corrupted message will request a new message from the sender, the original data is then encoded with a forward error correction (FEC) code, and the parity bits are sent along with the message or transmitted upon request when a receiver detects an error. HARQ performs better than ordinary ARQ in poor signal conditions, but in its simplest form this comes at the expense of significantly lower throughput in good signal conditions.

When a data transmission (e.g., a PPDU) is partially received (e.g., received with error), the receiver of the PPDU (TXOP responder) may be unable to calculate the duration information associated with PPDU to determine if retransmission of missing data (data received with error) can occur during the remainder of the TXOP granted to the TXOP holder.

SUMMARY

In view of the above, what is needed is an approach to HARQ that performs error correction while improving the efficiency of the retransmission scheme. Accordingly, embodiments of the present invention provide systems and methods for performing HARQ operations using HARQ threads that can determine MAC header information (e.g., duration information) based on information from a previously received PPDU. For example, transmission information for PPDUs including BA/HARQ-ACK feedback, such as duration information, RX/TX addresses, etc., can be determined according to previous transmission values of a received PPDU (e.g., values of a MAC or PHY header). The duration information can be used to determine the portion of the TXOP that is available for subsequent transmission, and HARQ threads end when the TXOP expires.

According to one embodiment, a method of data transmission in a wireless network using a plurality of hybrid automatic repeat request (HARQ) threads is disclosed. The method includes receiving a Physical Layer Convergence Procedure (PLCP) Protocol Data Unit (PPDU) including a HARQ retransmission including a plurality of HARQ threads, decoding MAC headers from the plurality of HARQ threads, and setting transmission information for a feedback response frame according to the MAC headers decoded from the plurality of HARQ threads.

According to some embodiments, the method includes transmitting the feedback response frame using the transmission information.

According to some embodiments setting transmission information for the feedback response frame according to the MAC headers includes setting a duration information field in a MAC header of the feedback response frame according to duration subfields in the MAC headers decoded from the plurality of HARQ threads.

According to some embodiments, setting transmission information for the feedback response frame according to the MAC headers includes setting a transmitter address (TA) field and a receiver address (RA) field in a MAC header of the feedback response frame according to the MAC header decoded from any thread in the PPDU.

According to some embodiments, setting transmission information for the feedback response frame includes setting a duration information field in a MAC header of the feedback response frame according to the PHY header of the PPDU.

According to some embodiments, setting transmission information for the feedback response frame includes setting a transmitter address (TA) field and a receiver address (RA) field in a MAC header of the feedback response frame according to the PHY header of the PPDU.

According to some embodiments, setting transmission information for the feedback response frame includes setting a duration information field in a MAC header of the feedback response frame according to a MAC header decoded from the HARQ retransmission.

According to some embodiments, the method includes deducting a transmission time of the PPDU to set the duration information field in the MAC header of the feedback response frame.

According to some embodiments, the method includes deducting a short interframe space (SIFS) time to set the duration information field in the MAC header of the feedback response frame.

According to a different embodiment, a method of data transmission in a wireless network using a HARQ thread is disclosed. The method includes receiving a Physical Layer Convergence Procedure (PLCP) Protocol Data Unit (PPDU) including a PHY header and a HARQ retransmission including a first HARQ thread, decoding a Media Access Control (MAC) Protocol Data Unit (MPDU) associated with the first HARQ thread, decoding the PHY header of the PPDU, and setting transmission information for a feedback response frame for the first HARQ thread according to the PHY header of the PPDU.

According to some embodiments, the feedback response frame includes a NACK frame that indicates a negative acknowledgement of the previously received payload.

According to some embodiments the method includes determining that the MPDU associated with the first HARQ thread is not decoded, where the NACK frame includes a HARQ thread bitmap indicating the first HARQ thread, a NACK field, and a HA Type field.

According to some embodiments, the PPDU further includes a PLCP Service Data Unit (PSDU) including a second HARQ thread.

According to some embodiments, the method includes determining that no MPDU associated with the second HARQ thread is decoded, where the NACK frame includes a HARQ thread bitmap indicating the second HARQ thread, a NACK field, and a HA Type field.

According to some embodiments, the feedback response frame includes a block acknowledgment (BA) including a BA control subfield value indicating NACK for all HARQ threads of the PPDU.

According to some embodiments, the method includes transmitting the feedback response frame indicating received coding units of the first HARQ thread.

According to some embodiments, setting transmission information for the feedback response frame according to the PHY header of the PPDU includes setting a duration information field in a MAC header of the feedback response frame according to the PHY header of the PPDU.

According to some embodiments, setting transmission information for the feedback response frame according to the PHY header of the PPDU includes setting a transmitter address (TA) field and a receiver address (RA) field in a MAC header of the feedback response frame according to the PHY header of the PPDU.

According to another embodiment, a device for transmitting data in a wireless network is disclosed. The device includes a transceiver configured to send and receive data on the wireless network, a memory for storing received PPDUs, and a processor operable to cause the transceiver to receive a PPDU including a PHY header, and a HARQ retransmission including a first HARQ thread, HARQ combine HARQ codewords of a previously received PPDU stored in the memory with HARQ codewords of the HARQ retransmission for decoding an MPDU associated with the first HARQ thread, decode the PHY header of the PPDU, and set transmission information for a feedback response frame for the first HARQ thread according to the PHY header of the PPDU.

According to some embodiments, setting transmission information for the feedback response frame includes setting a transmitter address (TA) field and a receiver address (RA) field in a MAC header of the feedback response frame according to the PHY header of the PPDU and setting a duration information field in the MAC header of the feedback response frame according to the PHY header of the PPDU.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
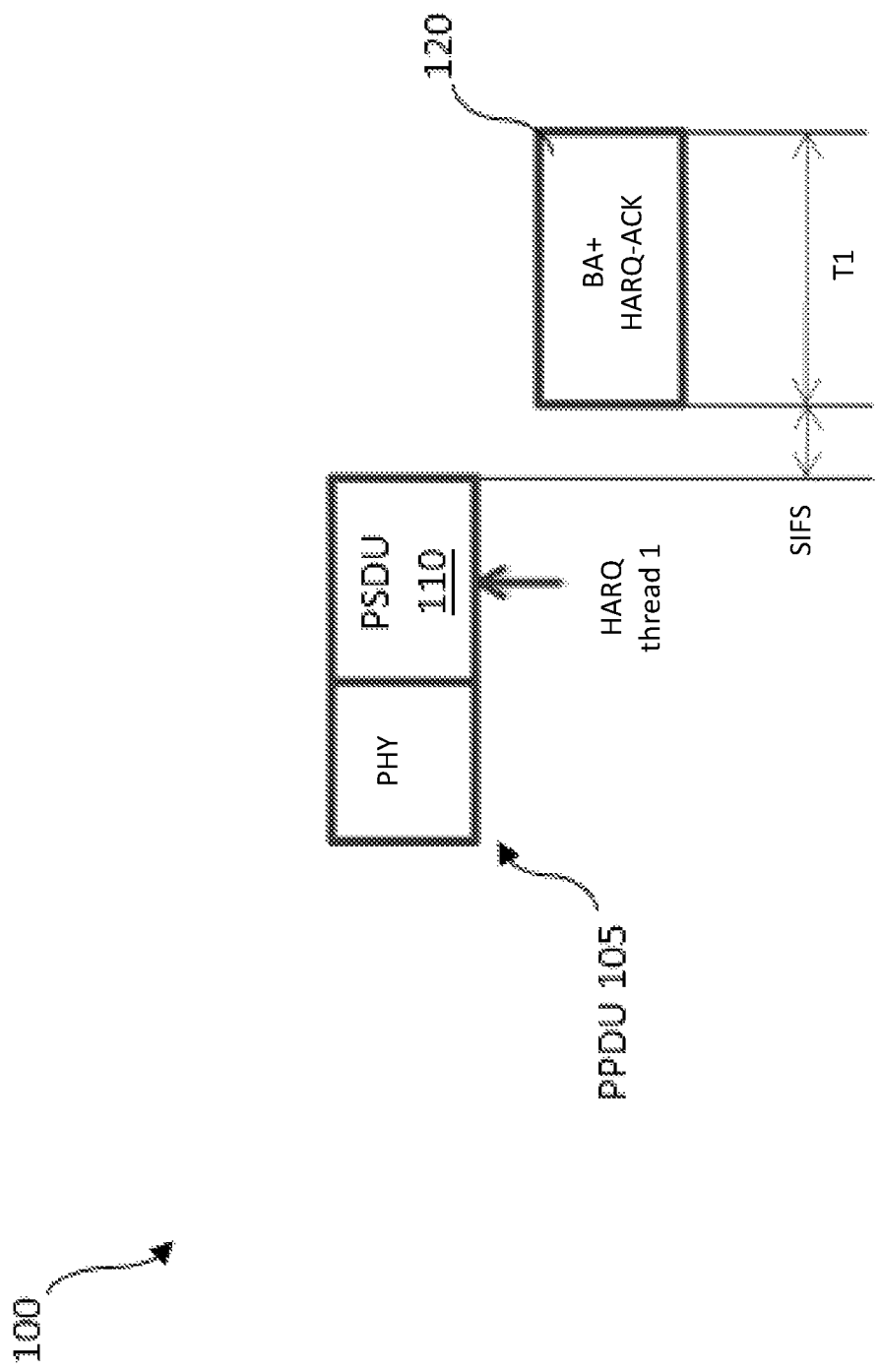
FIG. 1 is a transmission timing diagram depicting an exemplary HARQ operation using a HARQ thread when a MAC header is successfully decoded according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 12 and 13) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel HARQ TXOP Frame Exchange for HARQ Retransmission Using HARQ Threads

As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments described herein provide apparatus and methods for performing HARQ operations using parallel HARQ threads, where each new transmission of a Media Access Control (MAC) Protocol Data Unit (MPDU)/Aggregate-MPDU (A-MPDU)/Physical Layer Convergence Procedure (PLCP) Service Data Unit (PSDU) triggers the activation of a HARQ thread. Each HARQ thread contains one or more HARQ coding words or coding units. A HARQ thread index is setup by a transmission opportunity (TXOP) holder for a corresponding PSDU and is used to identify HARQ threads. Multiple HARQ threads can be aggregated into one PLCP Protocol Data Unit (PPDU) for transmission (or retransmission). Transmission information for PPDUs including a feedback response frame (e.g., BA or HARQ-ACK feedback), such as duration information, RX/TX addresses, etc., can be determined according to transmission values of a previously received PPDU (e.g., values of a MAC or PHY header).

According to some embodiments, a HARQ thread ends when the TXOP associated with the HARQ thread expires. When a data transmission (e.g., a PPDU) is partially received (e.g., received with error), the receiver of the PPDU (TXOP responder) may be unable to calculate the duration information associated with the PPDU to determine if retransmission of missing data (data received with error) can occur during the remainder of the TXOP granted to the TXOP holder.

Accordingly, with regard to FIG. 1, an exemplary transmission timing diagram 100 depicting an exemplary HARQ operation using HARQ threads is depicted according to embodiments of the present invention. PPDU 105 contains a new transmission PSDU 110 that is associated with HARQ thread 1. The TXOP responder sets the transmitted address (TA)/receiver address (RA) and Duration field in the MAC header of the response PPDU carrying BA/HARQ-ACK frame 120 according to the TA/RA and Duration field of the MAC header from the received PSDU 110. For example, the value of the Duration field of BA/HARQ-ACK frame 120 can be set to the value of the Duration field of PSDU1 minus the transmission time (T1) of BA/HARQ-ACK and further minus one SIFS time.

In the embodiment depicted in FIG. 1, the TXOP responder received the PPDU 105 successfully and correctly decoded one or more MPDUs so that the MAC header of PSDU 110 is successfully decoded. After a Short Interframe Space (SIFS) time, a TXOP responder transmits a block acknowledgement (BA) HARQ-Acknowledgement (ACK)

frame 120 that indicates those HARQ coding units of HARQ thread 1 that were decoded successfully. BA/HARQ-ACK frame 120 can include a BA or a HARCK-ACK. BA/HARQ-ACK frame 120 requires a transmission time of T1. A BA is transmitted to acknowledge MPDU(s) of HARQ thread 1 which is/are received/decoded successfully. A HARQ-ACK is transmitted when individual HARQ coding words or units require retransmission.

Figure 2:
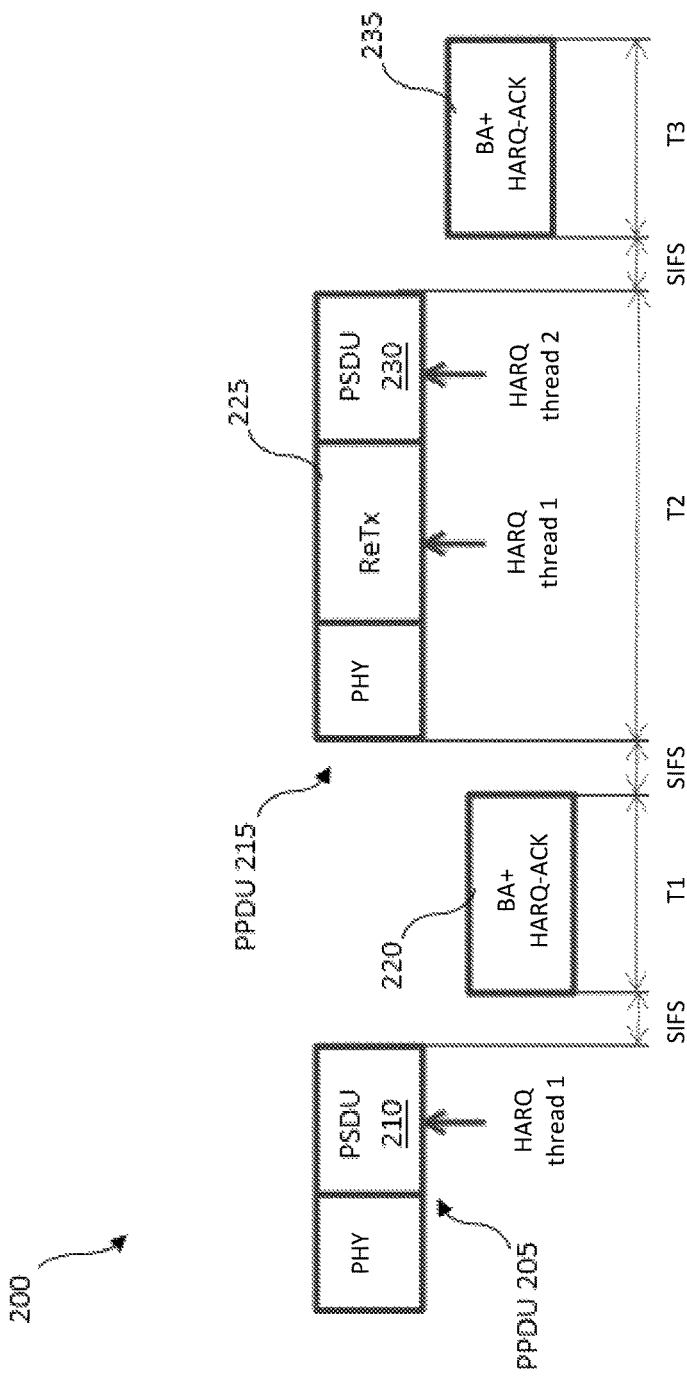
FIG. 2 is a transmission timing diagram depicting an exemplary HARQ operation using multiple HARQ threads when a MAC header is successfully decoded according to embodiments of the present invention.

With regard to FIG. 2, an exemplary transmission timing diagram 200 depicting an exemplary HARQ operation using HARQ threads is depicted according to embodiments of the present invention. PPDU 205 contains a new transmission PSDU 210 that is associated with HARQ thread 1. In the embodiment depicted in FIG. 2, the TXOP responder receives the PPDU 205 and successfully decodes one or more MPDUs, and the MAC header of PSDU 210 is decoded successfully.

PPDU 215 contains a retransmission for HARQ thread 1 225 and a new transmission PSDU 230. Packets that are received with an error are stored, and the retransmitted HARQ data (e.g., coding words) can be used in combination with the stored data to correct any received errors (a "retransmission"). The TXOP responder transmits a feedback response frame 235. Specifically, the TXOP responder transmits a block acknowledgement HARQ-Acknowledgement (ACK) feedback 235 that indicates those HARQ coding units of HARQ thread 1 and HARQ thread 2 that were decoded successfully. The TXOP initiator retransmits unacknowledged HARQ coding units from HARQ thread 1 based on the HARQ-ACK feedback 220 received from the TXOP responder.

The TXOP responder decodes MPDUs from PSDU 210 and PSDU 230 and transmits HARQ-ACK feedback 235 when HARQ coding units of HARQ thread 1 and/or HARQ thread 2 are missing (e.g., decoded with error). The TXOP responder sets the TA/RA field of in the MAC header of the BA of BA/HARQ-ACK feedback 235 based on the received MAC header from PSDU 210 or PSDU 230. The TXOP responder sets the Duration field in the MAC header of the BA based on the received MAC header from PSDU 230. For example, the value of the Duration field of the BA can be set to the value of the Duration field of PSDU 230 minus the transmission time (T3) of BA/HARQ-ACK feedback 235 and one SIFS time.

Figure 3:
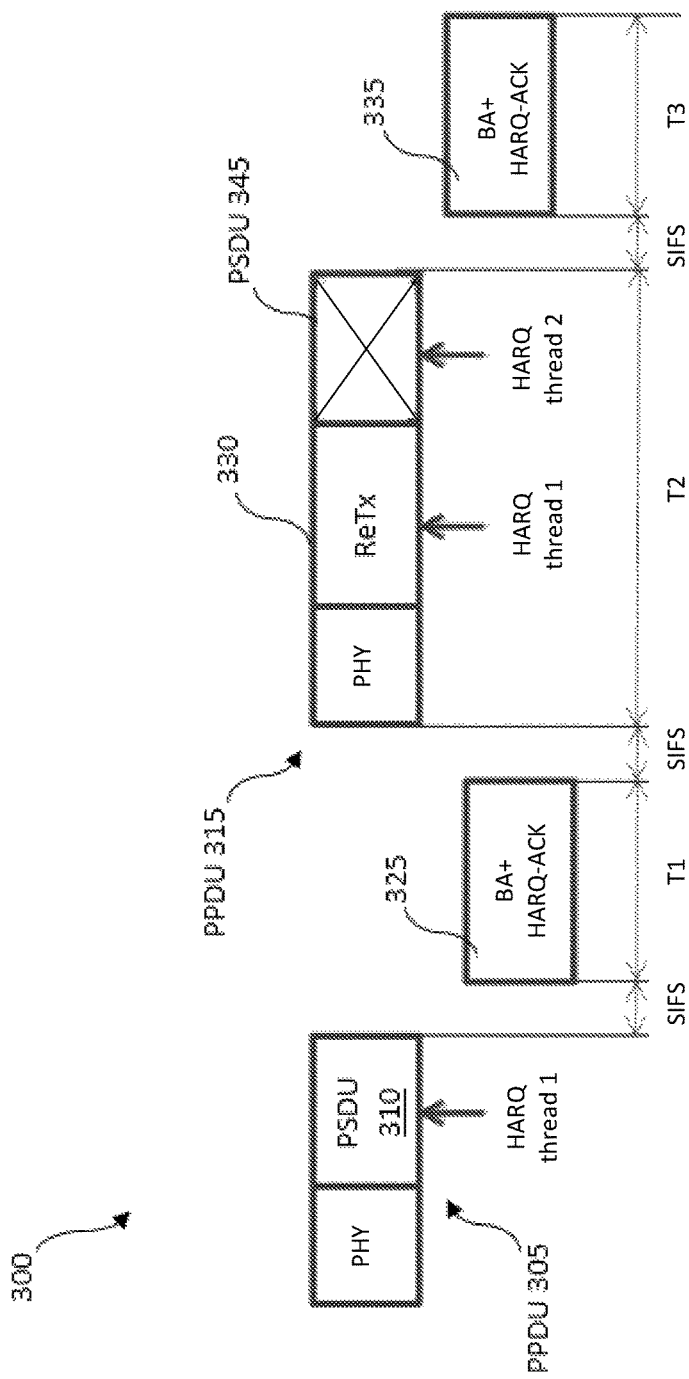
FIG. 3 is a transmission timing diagram depicting an exemplary HARQ operation using multiple HARQ threads when a PSDU is not successfully decoded according to embodiments of the present invention.

With regard to FIG. 3, an exemplary transmission timing diagram 300 is shown depicting a HARQ operation using multiple HARQ threads when a PSDU is not successfully decoded according to embodiments of the present invention. PPDU 305 contains a new transmission PSDU 310 that is associated with HARQ thread 1. In the embodiment depicted in FIG. 3, the TXOP responder receives PPDU 305 successfully and correctly decodes one or more MPDUs. The MAC header of PSDU 310 is decoded successfully. BA/HARQ-ACK feedback 325 is transmitted to acknowledge successfully received data (e.g., HARQ codewords or PSDUs) of HARQ thread 1 in PSDU 310.

In the embodiment depicted in transmission timing diagram 300, the TXOP responder correctly decodes MPDUs from PSDU 310, but does not correctly decode MPDUs from PSDU 345. The TXOP responder sets the TA/RA and Duration field of the MAC header for BA/HARQ-ACK feedback 335 based on the TA/RA and Duration field of the MAC header of PPDU 315. PPDU 315 is received by the TXOP responder and includes a retransmission 330 for HARQ thread 1 aggregated with a new transmission PSDU 345. The value of the Duration field of BA is set to the value of the Duration field of PSDU 310 (HARQ thread 1) minus the transmission time (T1+T3) of BA/HARQ-ACK frames 325 and 335, minus the transmission time (T2) of PPDU 315, and further minus 3 SIFS times. The retransmitted data for HARQ thread 1 can be HARQ combined with the data of PSDU 310 that was received successfully to decode one or more MPDUs associated with HARQ thread 1.

Figure 4:
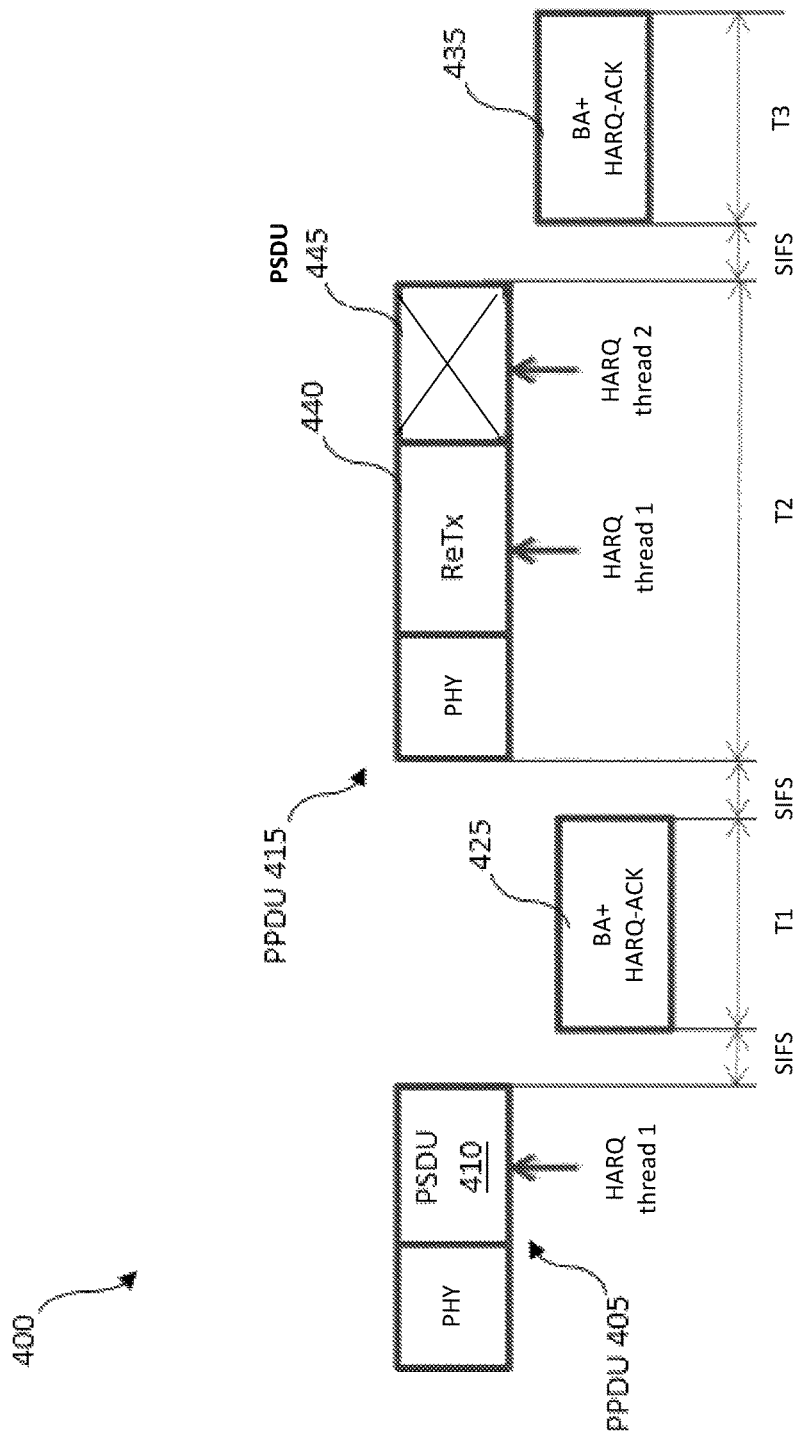
FIG. 4 is a transmission timing diagram depicting an exemplary HARQ operation using multiple HARQ threads when a MAC header is successfully decoded and setting transmission information according to the MAC header of a received MPDU and a PHY header of a received PPDU according to embodiments of the present invention.

FIG. 4 is a transmission timing diagram depicting an exemplary HARQ operation 400 using multiple HARQ threads when a MAC header is successfully decoded and setting transmission information according to the MAC header and a PHY header of a received PSDU according to embodiments of the present invention. In the embodiment depicted in FIG. 4, the TXOP responder receives PPDU 405 successfully and correctly decodes one or more MPDUs associated with HARQ thread 1. The MAC header of PSDU 410 is decoded successfully. The TXOP responder sets the TA/RA and Duration field in the MAC header of the response PPDU carrying a feedback response frame/acknowledgement (e.g., a BA) based on the TA/RA and Duration field of a MAC header from the received PSDU (e.g., PSDU 410) decoded after HARQ combining the coding words or coding units of HARQ thread 1.

As depicted in FIG. 4, the TXOP initiator retransmits unacknowledged (missed) HARQ coding units from HARQ thread 1 in PSDU 410 based on the BA/HARQ-ACK feedback 425 aggregated with PSDU 445 (corresponding to HARQ thread 2) in PPDU 415. The TXOP responder correctly decodes MPDUs from PSDU 410, but does not correctly decode MPDUs from PSDU 445. The TXOP responder transmits BA/HARQ-ACK feedback 435 when HARQ coding units from HARQ thread 1 and/or HARQ thread 2 are missing (received in error/not decoded successfully) to indicate the missing coding units.

In the example depicted in FIG. 4, the TXOP responder sets the TA/RA field in the MAC header of BA/HARQ-ACK feedback 435 based on the received MAC header from PSDU 410. The TXOP responder sets the Duration field of the MAC header for BA/HARQ-ACK feedback 435 based on the received MAC header from PSDU 410 or the PHY header from PPDU 415. For example, the retransmitted data for HARQ thread 1 440 can be HARQ combined with the data of PSDU 410 that was received successfully to decode one or more MPDUs. The value of the Duration field of BA 435 can be set to the value of the Duration field of the decoded MPDUs of PSDU 410 (associated with HARQ thread 1) minus the transmission time (T1+T3) of BA/HARQ-ACK feedback frames 425 and 435, minus the transmission time (T2) of PPDU2, further minus 3 SIFS time periods. The PHY header of PPDU 415 carries duration information based on the duration field of PSDU 445, and the duration information of BA/HARQ-ACK feedback frame 435 can also be set based on the duration information of the PHY header of PPDU 415. BA/HARQ-ACK feedback frame 435 indicates that PSDU 445 (associated with HARQ thread 2) was not received successfully.

Figure 5:
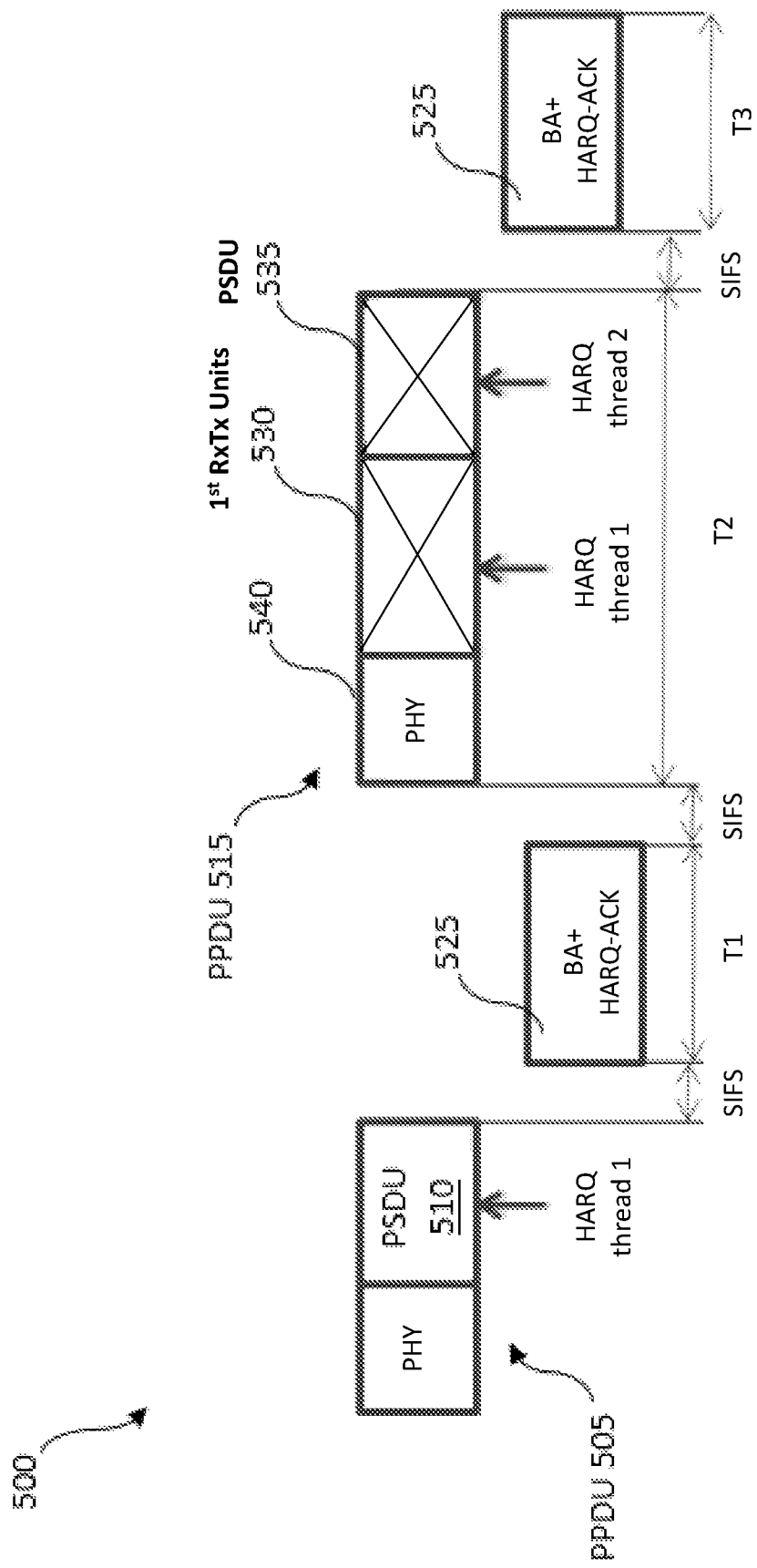
FIG. 5 is a transmission timing diagram depicting an exemplary HARQ operation using multiple HARQ threads when a MAC header is not successfully decoded, and setting transmission information according to a PHY header of a received PSDU according to embodiments of the present invention.

FIG. 5 is a transmission timing diagram depicting an exemplary HARQ operation 500 using multiple HARQ threads when a MAC header of PSDU 510 is not successfully decoded including setting transmission information according to a PHY header of a received PSDU according to embodiments of the present invention. In the example depicted in FIG. 5, the MAC header of a previously received PPDU (e.g., PPDU 505) is not decoded correctly, while the PHY header of the received PPDU is decoded successfully.

In the example depicted in FIG. 5, the TXOP responder sets the TA/RA and Duration field of a MAC header for BA/HARQ-ACK feedback frames 525 based on the PHY header of the received PPDU. The TXOP initiator retransmits unacknowledged HARQ coding units from HARQ thread 1 in PPDU 515 based on the BA/HARQ-ACK feedback 525 from the TXOP responder, and a new transmission PSDU 535 (corresponding to HARQ thread 2) aggregated in PPDU 515.

The PHY header of PPDU 515 carries basic service set (BSS) and non-AP STA identifier (e.g., BSS Color, short BSSID, STA ID/AID, short STA MAC address, etc.), and may also carry an UPLINK FLAG field to indicate uplink or downlink traffic. The PHY header of PPDU 515 carries a TXOP Duration subfield which is set based on the Duration field of PSDU 535. The resolution of the TXOP Duration subfield value can be different from that of the Duration field carried in PSDU 535. The TXOP responder correctly receives the PHY header of PSDU 535, but does not successfully decode MPDUs from either PSDU 505 including PSDU 510 (after HARQ combining with HARQ retransmission 530) or PSDU 535 including PSDU 535.

The TXOP responder transmits a feedback response frame. Specifically, the TXOP responder can transmits BA/HARQ-ACK feedback 525 with a NACK indication (indicating that nothing was received successfully) and can indicate any missed HARQ coding units from HARQ thread 1 and/or HARQ thread 2.

The TXOP responder sets the TA/RA field of the MAC header for BA/HARQ-ACK feedback 525 based on the received PHY header of PSDU 535. For example, if PSDU 535 is a downlink transmission, the TXOP responder sets the RA based on the BSS Color or short BSSID, if available. If PSDU 535 is an uplink transmission, the TXOP responder sets the RA based on STA ID or AID or short STA MAC address, if available. The TXOP responder sets the Duration field in the MAC header of a BA in BA/HARQ-ACK feedback 525 based on the received PHY header 540 of PPDU 515. For example, the TXOP responder can set the value of Duration field to the value of TXOP Duration subfield in the PHY header of PPDU 515 minus the transmission time (T3) for BA/HARQ-ACK feedback 525 and one SIFS time.

Figure 6:
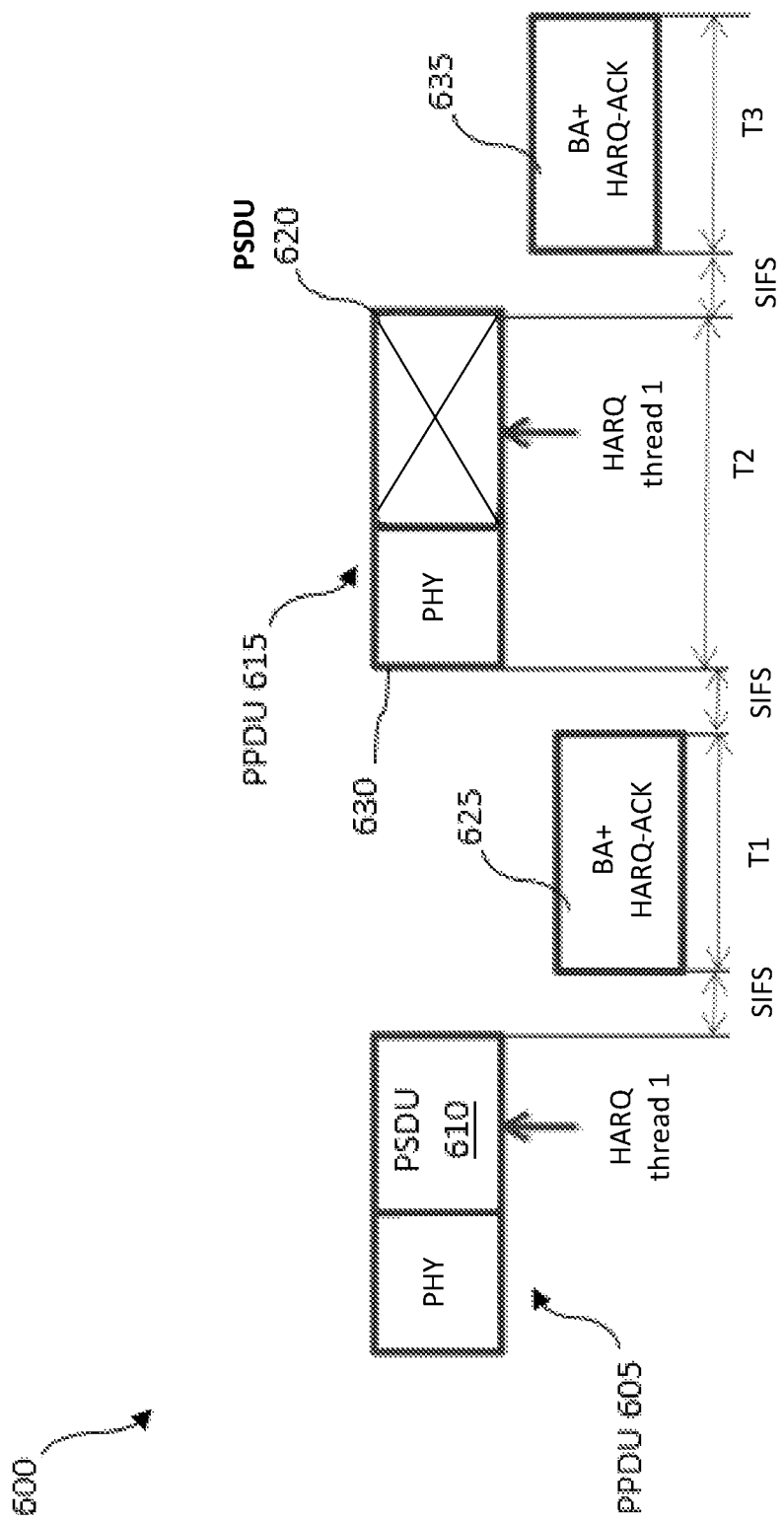
FIG. 6 is a transmission timing diagram depicting an exemplary HARQ operation using multiple HARQ threads when a MAC header is not successfully decoded, and setting transmission information according to PHY header of a received PSDU according to embodiments of the present invention.

FIG. 6 is a transmission timing diagram depicting an exemplary HARQ operation 600 using multiple HARQ threads when a MAC header is not successfully decoded including setting transmission information according to a PHY header of a received PSDU according to embodiments of the present invention. In the example depicted in FIG. 6, the TXOP responder sets the TA/RA and Duration field in the MAC header of the response PPDU carrying an acknowledgement (e.g., BA/HARQ-ACK feedback 635) based on the PHY header of a received PPDU (e.g., PPDU 615). As depicted in FIG. 6, The TXOP initiator retransmits unacknowledged HARQ coding units 620 for HARQ thread 1 based on the BA/HARQ-ACK feedback 625.

The PHY header of PPDU 615 carries BSS and non-AP STA identifier such as BSS Color, short BSSID, STA ID/AID, short STA MAC address etc. and may also carry UPLINK FLAG to indicate uplink or downlink traffic. The PHY header of PPDU 615 carries TXOP Duration subfield which is based on the Duration field of BA/HARQ-ACK 625 minus the transmission duration (T2) of PPDU 615 and further minus one SIFS. The resolution of TXOP Duration subfield value can be different from that of the Duration field of BA/HARQ-ACK 625.

As depicted in FIG. 6, the TXOP responder correctly received the PHY header of PPDU 615, but did not correctly decode MPDUs from PSDU 610 after performing HARQ combining using HARQ retransmission 620 with PSDU 610 of PPDU 605. The TXOP responder sends BA/HARQ-ACK 635 with NACK indication (indicating that nothing was received successfully) and indicating missed HARQ coding units from HARQ thread 1.

The TXOP responder sets the TA/RA field in the MAC header of BA/HARQ-ACK 635 based on PHY header 630 of PPDU 615. For example, if PPDU 615 is a downlink transmission, the TXOP responder sets the RA based on the BSS Color or short BSSID, if available. If PPDU2 615 is an uplink transmission, the TXOP responder sets the RA based on the STA ID, AID, or short STA MAC address, if available. The TXOP responder sets the Duration field in the MAC header of the BA based on PHY header 630 of PPDU 615. For example, the TXOP responder can set the value of Duration field to the value of TXOP Duration subfield in the PHY header 615 of PPDU 615 minus the transmission duration of BA/HARQ-ACK 635 (T3) and further minus one SIFS time.

Figure 7:
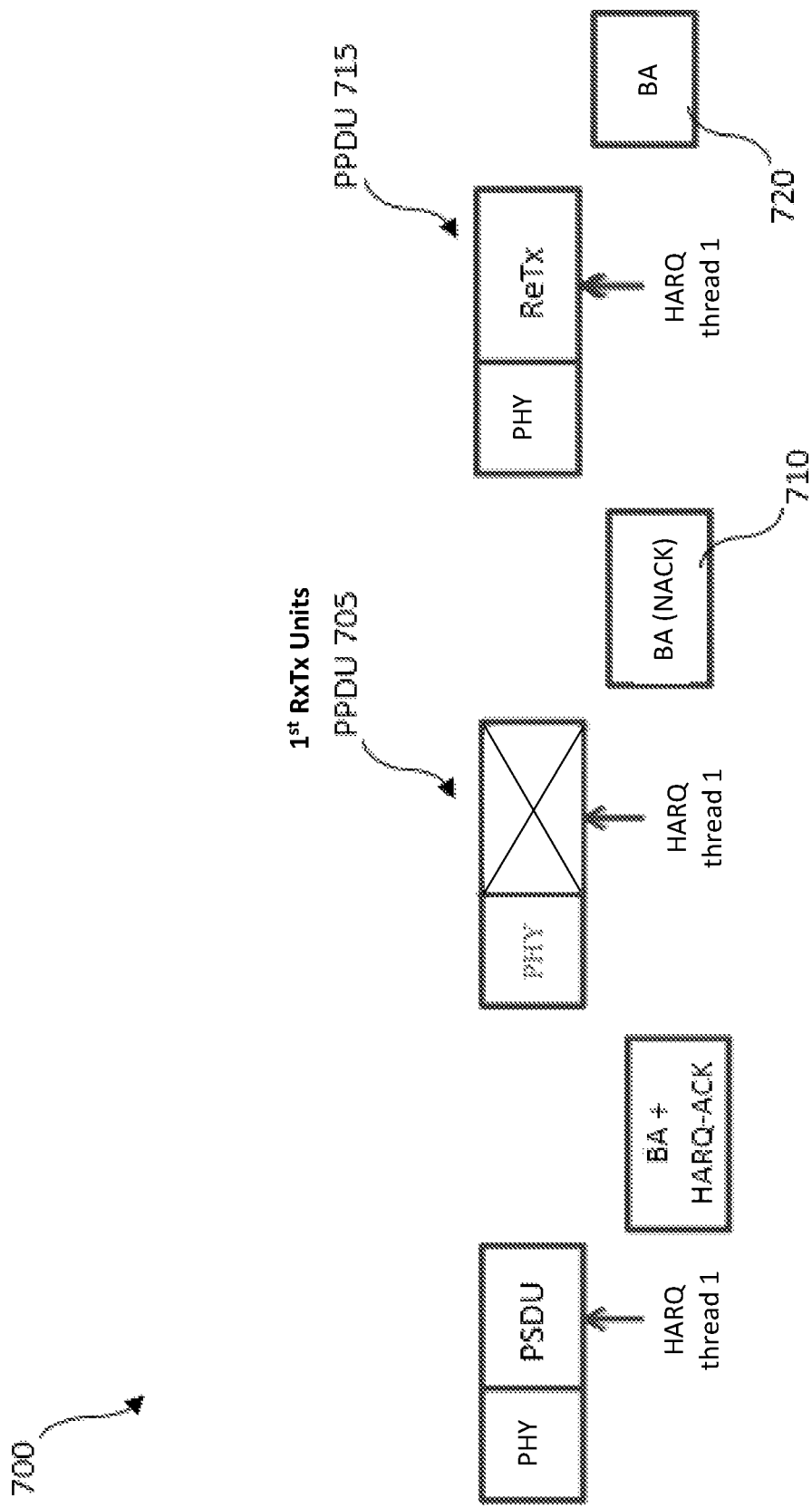
FIG. 7 is a transmission timing diagram depicting an exemplary HARQ operation using multiple HARQ threads and a NACK frame according to embodiments of the present invention.

FIG. 7 is a transmission timing diagram depicting an exemplary HARQ operation 700 using multiple HARQ threads and a NACK frame according to embodiments of the present invention. In the embodiment depicted in FIG. 7, after receiving PPDU 705, the TXOP responder sends BA (NACK) 710 to trigger the TXOP initiator to retransmit the payload of PPDU 705 (retransmitted for HARQ thread 1 in PPDU 715). BA (NACK) 710 can use a BA frame with a bit in the BA control subfield set to indicate NACK (negative acknowledgement). The HA type field indicates if a HARQ thread requires retransmission. For example, when both the HA Type and NACK subfields are set to 1, the TXOP initiator retransmits the payload of PPDU 705 in HARQ retransmission 715. It should be appreciated that the HARQ retransmission 715 may be transmitted with transmission parameters (MCS, resource allocation, etc.) that are different than the original transmission. The BA information subfield is optional. BA 720 is sent to acknowledge successful reception of PDDU 715.

Figure 8:
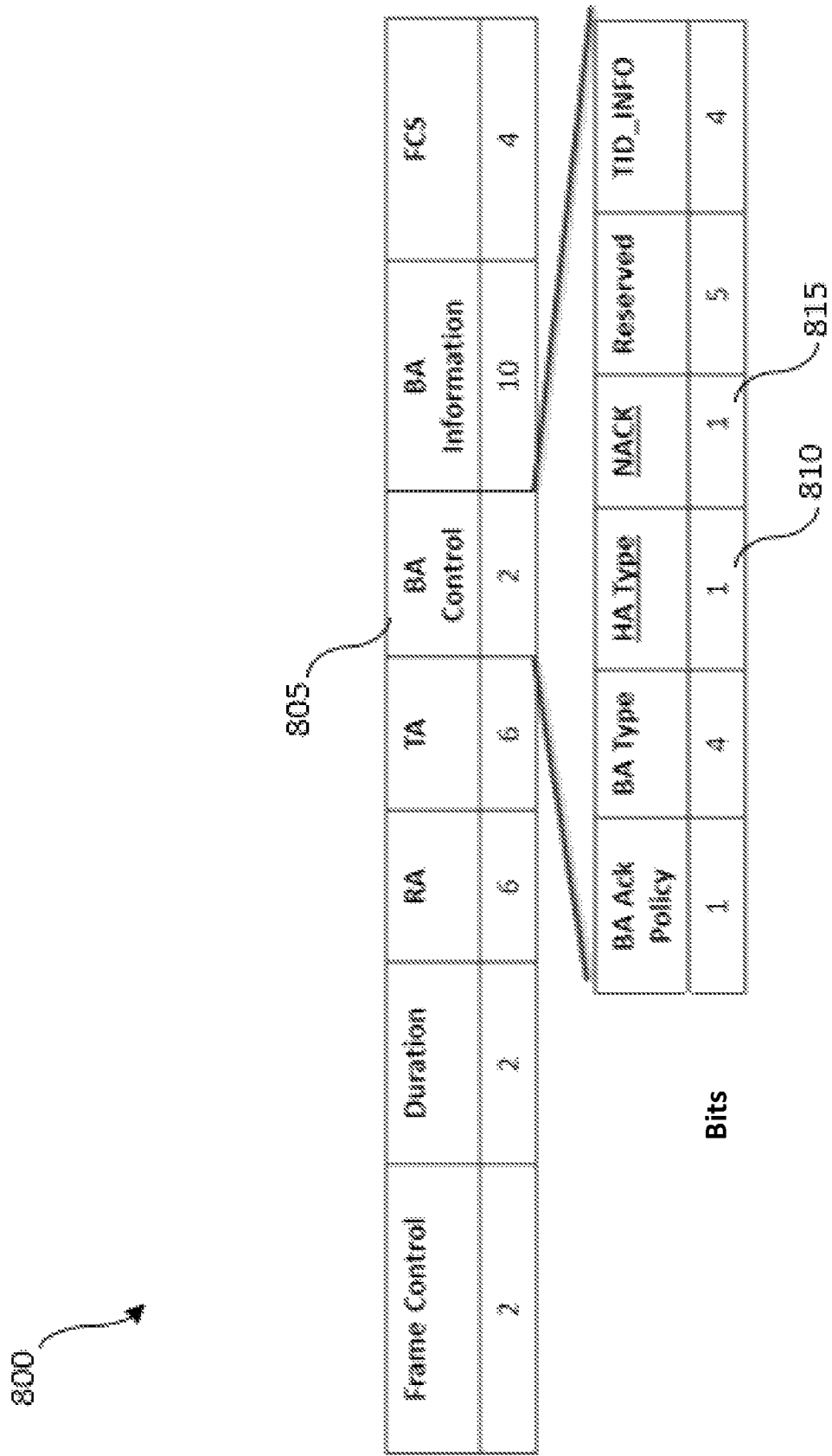
FIG. 8 is a block diagram of an exemplary BA field for performing HARQ retransmissions using multiple HARQ threads according to embodiments of the present invention.

FIG. 8 is a block diagram of an exemplary BA frame 800 including a BA control field 805 for performing HARQ retransmissions using multiple HARQ threads according to embodiments of the present invention. The BA control subfield 805 of BA frame 800 can indicate negative acknowledgement in NACK subfield 815. For example, when both HA Type subfield 810 and NACK subfield 815 are set to 1, the TXOP initiator automatically retransmits the payload of the previously sent PPDU.

Figure 9:
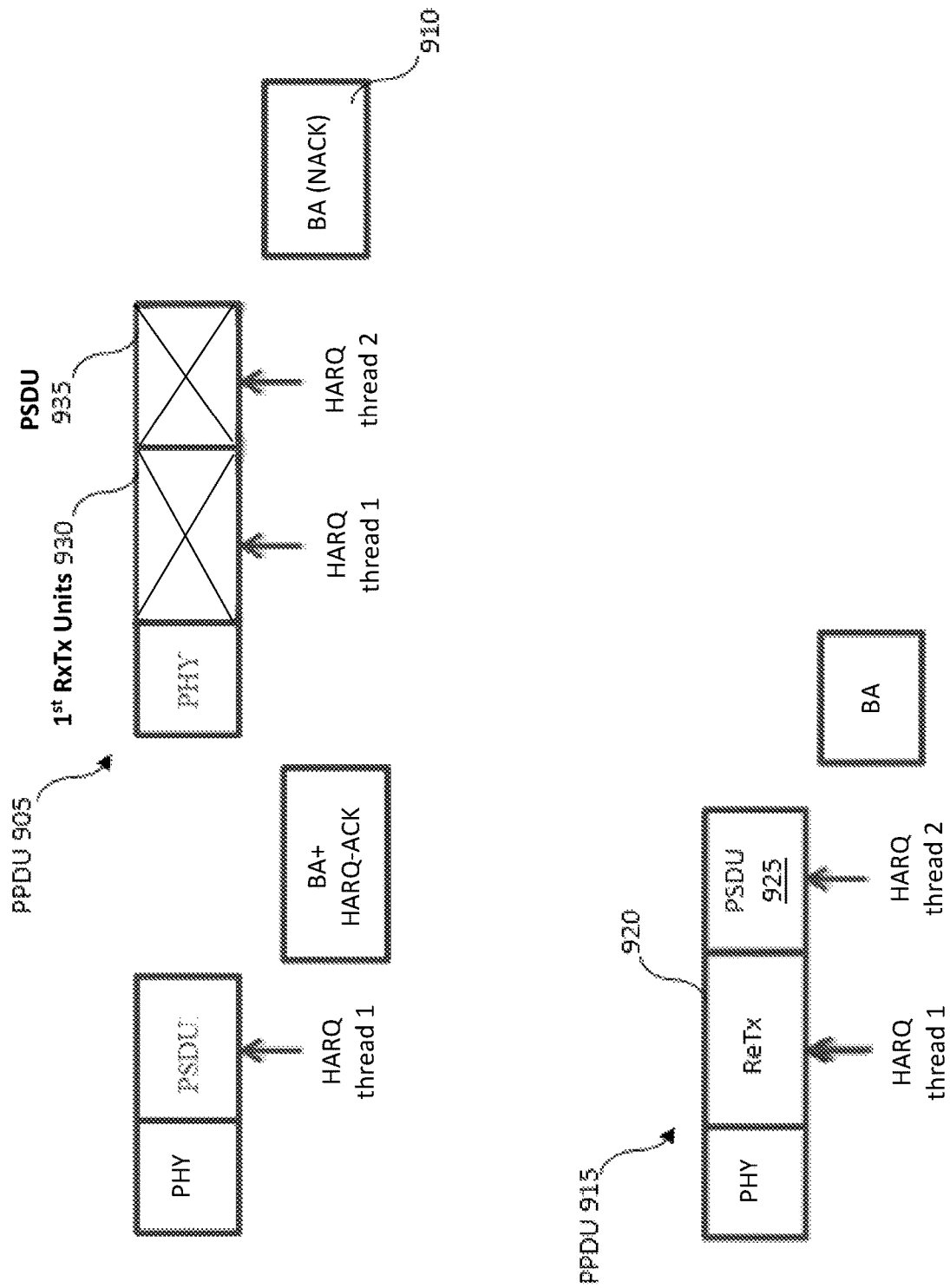
FIG. 9 is a block diagram of an exemplary HARQ SIG field for performing HARQ retransmissions using multiple HARQ threads using a bit in a BA control subfield to indicate NACK for all the HARQ threads included in a received PPDU according to embodiments of the present invention.

FIG. 9 is a transmission timing diagram depicting an exemplary HARQ operation 900 using multiple HARQ threads and a NACK frame to trigger the retransmission of a payload of the previously sent PPDU. The TXOP initiator transmits a PPDU 905 including a HARQ retransmission 930 including HARQ thread 1 and a new data transmission PSDU 935 including HARQ thread 2 according to embodiments of the present invention. After receiving PPDU 905, the TXOP responder sends BA (NACK) 910 to trigger the TXOP initiator to retransmit the payload of PPDU 905 (retransmitted in PPDU 915).

BA (NACK) 710 can include a BA frame with a bit in the BA control subfield set to indicate NACK (negative acknowledgement). For example, when both the HA Type and NACK subfields are set to 1, the TXOP initiator re-transmits the payload of PPDU 905 in PPDU 915 including HARQ retransmission 920 for HARQ thread 1 and new transmission PSDU 925 associated with HARQ thread 2.

Figure 10:
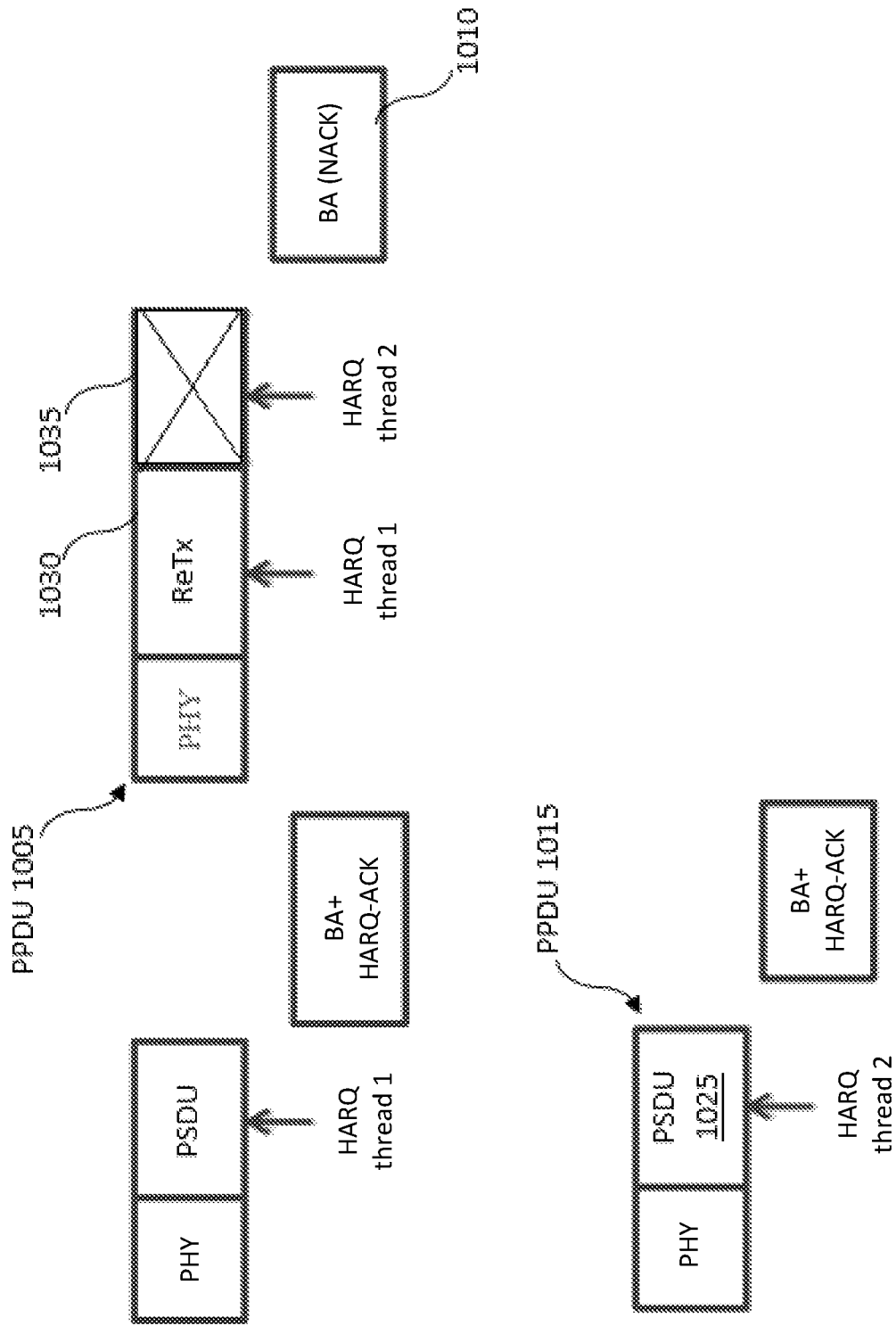
FIG. 10 is a block diagram of an exemplary HARQ SIG field for performing HARQ retransmissions using multiple HARQ threads using a bit in a BA control subfield to indicate NACK for all the HARQ threads indicated in a HARQ thread bitmap in a received PPDU according to embodiments of the present invention.

FIG. 10 is a transmission timing diagram depicting an exemplary HARQ operation 1000 using multiple HARQ threads and a HARQ thread bitmap to trigger the retransmission of a payload of the previously sent PPDU. As depicted in FIG. 10, the previously sent PPDU 1005 includes a HARQ retransmission 1030 for HARQ thread 1 and a new data transmission PSDU 1025 including HARQ thread 2 according to embodiments of the present invention. After receiving PPDU 1005, the TXOP responder sends BA (NACK) 1010 to trigger the TXOP initiator to retransmit the payload of PPDU 1005 (retransmitted in PPDU 1015). BA (NACK) 1010 can be a BA frame with a NACK subfield of a BA control subfield set to the corresponding HARQ thread indicated in the HARQ thread bitmap.

The HARQ thread bitmap field (e.g., HARQ thread bitmap field 1105 depicted in FIG. 11) indicates HARQ thread 2 with NACK. When both the HA Type and NACK subfields are set to 1, the TXOP initiator re-transmits the payload of the preceding PPDU for HARQ thread 2 indicated in the HARQ thread bitmap (e.g., PSDU 1025). As depicted in FIG. 10, the TXOP initiator re-transmits PSDU 1025 for HARQ thread 2 in PPDU 1015.

Figure 11:
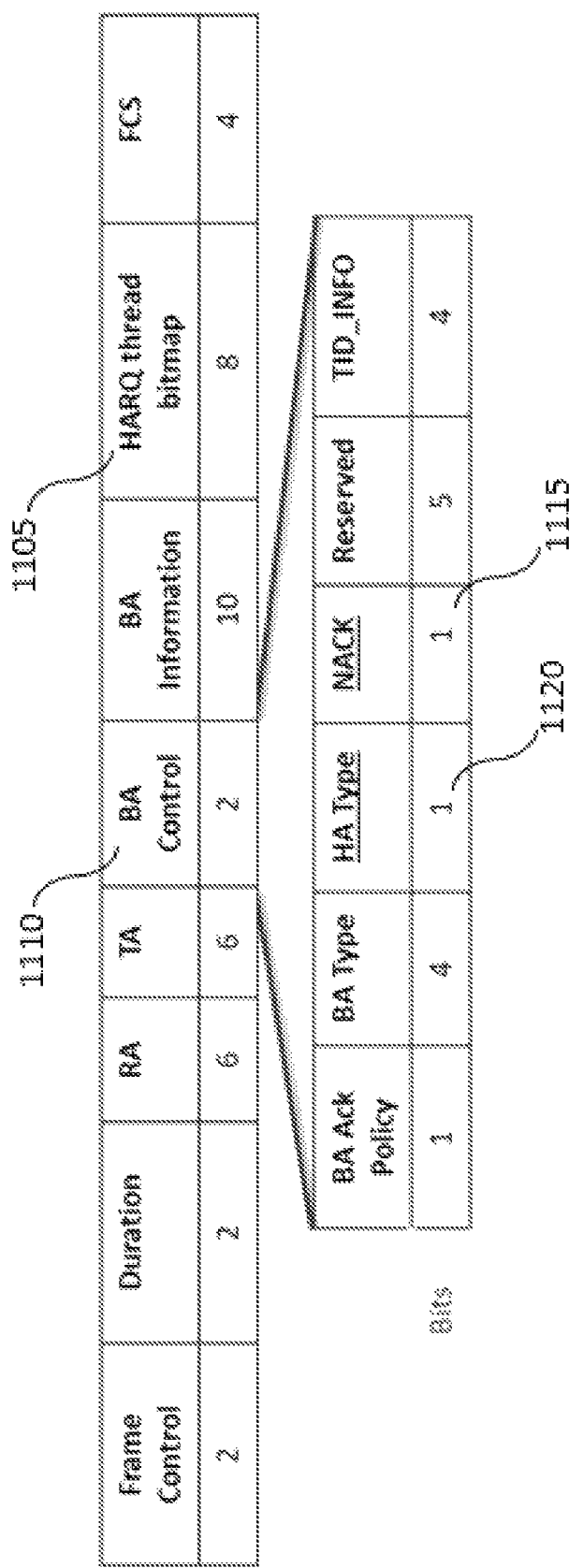
FIG. 11 is a block diagram of an exemplary BA frame including a BA control field and a HARQ thread bitmap field for performing HARQ retransmissions using multiple HARQ threads according to embodiments of the present invention.

FIG. 11 is a block diagram of an exemplary BA frame 1100 including a BA control field and a HARQ thread bitmap field 1105 for performing HARQ retransmissions using multiple HARQ threads according to embodiments of the present invention. NACK subfield in 1115 in BA control subfield 1110 of BA frame 1100 can be set to indicate NACK (negative acknowledgement) for a HARQ thread indicated in the HARQ thread bitmap field 1105. In the example depicted in FIG. 11, HARQ thread bitmap subfield 1105 indicates NACK for PSDU 1035 (for HARQ thread 2). When both the HA Type subfield 1120 and NACK subfield 1115 are set to 1, the TXOP initiator re-transmits the payload of preceding PPDU for HARQ thread 2 (e.g., PSDU 1025 in FIG. 10) indicated in the HARQ thread bitmap field 1105.

Figure 12:
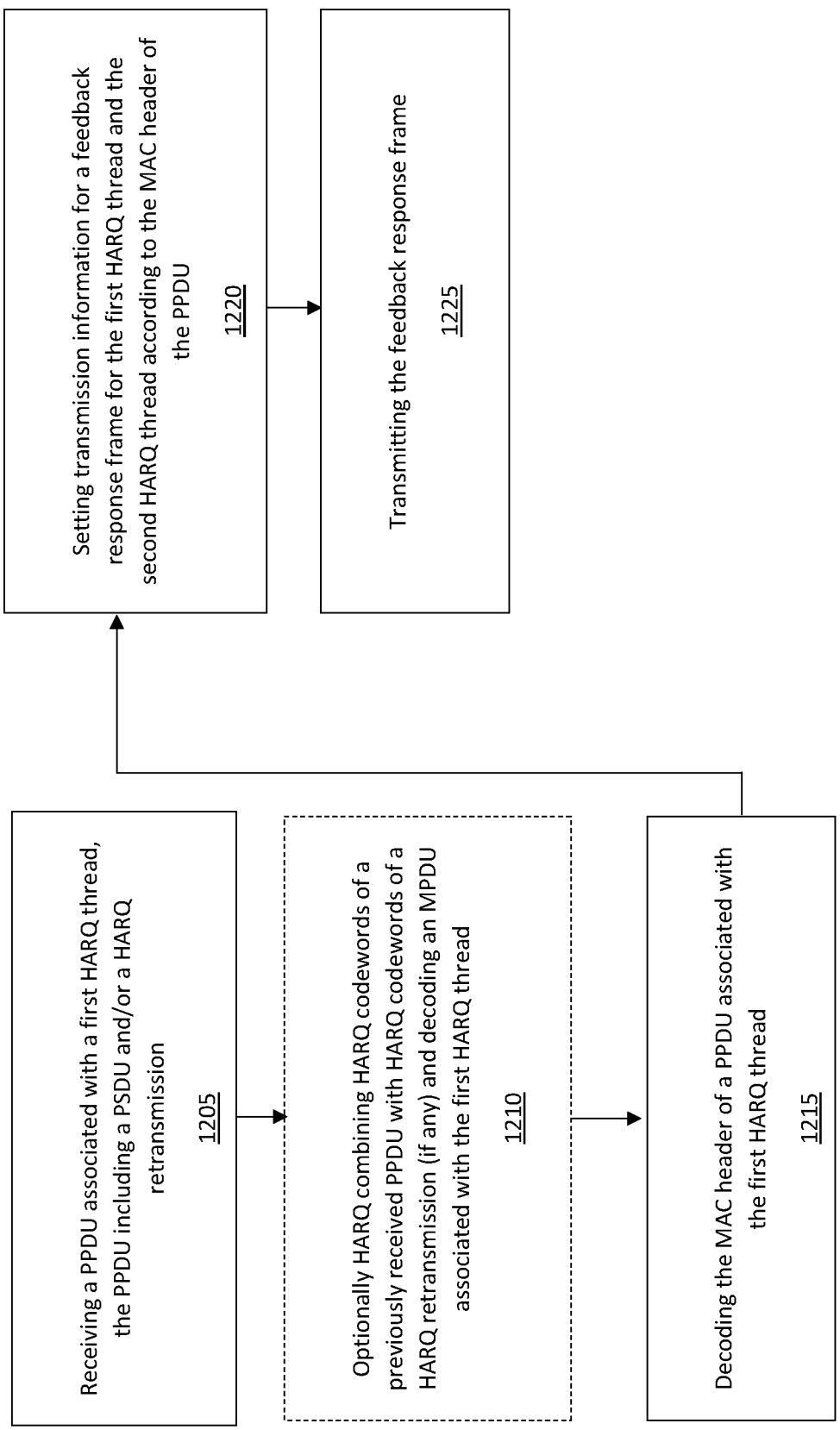
FIG. 12 is a flow chart depicting an exemplary sequence of computer implemented steps for performing feedback for a HARQ retransmission using a decoded MAC header according to embodiments of the present invention.

FIG. 12 is a flow chart depicting an exemplary sequence of computer implemented steps of a process 1200 for automatically providing a feedback response frame for a HARQ transmission using a decoded MAC header according to embodiments of the present invention. The process 1200 can be performed by a wireless device (e.g., a wireless STA or AP, a TXOP responder, etc.) over a wireless network.

At step 1205, a PPDU associated with a first HARQ thread is received. The PPDU can include a MAC header, a HARQ retransmission, and/or a PSDU. A HARQ retransmission (if present) and the PSDU are associated with different HARQ threads.

At step 1210, HARQ codewords of any HARQ retransmissions are optionally HARQ combined with HARQ codewords of a previously received PPDU.

At step 1215, a MAC header of the PPDU associated with a first HARQ thread is decoded. The MAC header can include duration information, an RA field, a TA field, etc.

At step 1220, transmission information is set for a feedback response frame for any HARQ threads according to the MAC header of the PPDU (e.g., the duration information, the RA field, and the TA field).

At step 1225, the feedback response frame is transmitted. The feedback can indicate correctly received MPDUs (BA), correctly received HARQ coding words or units (HARQ-ACK), or a NACK. A NACK can automatically trigger retransmission of the payload of the previously received PPDU.

Figure 13:
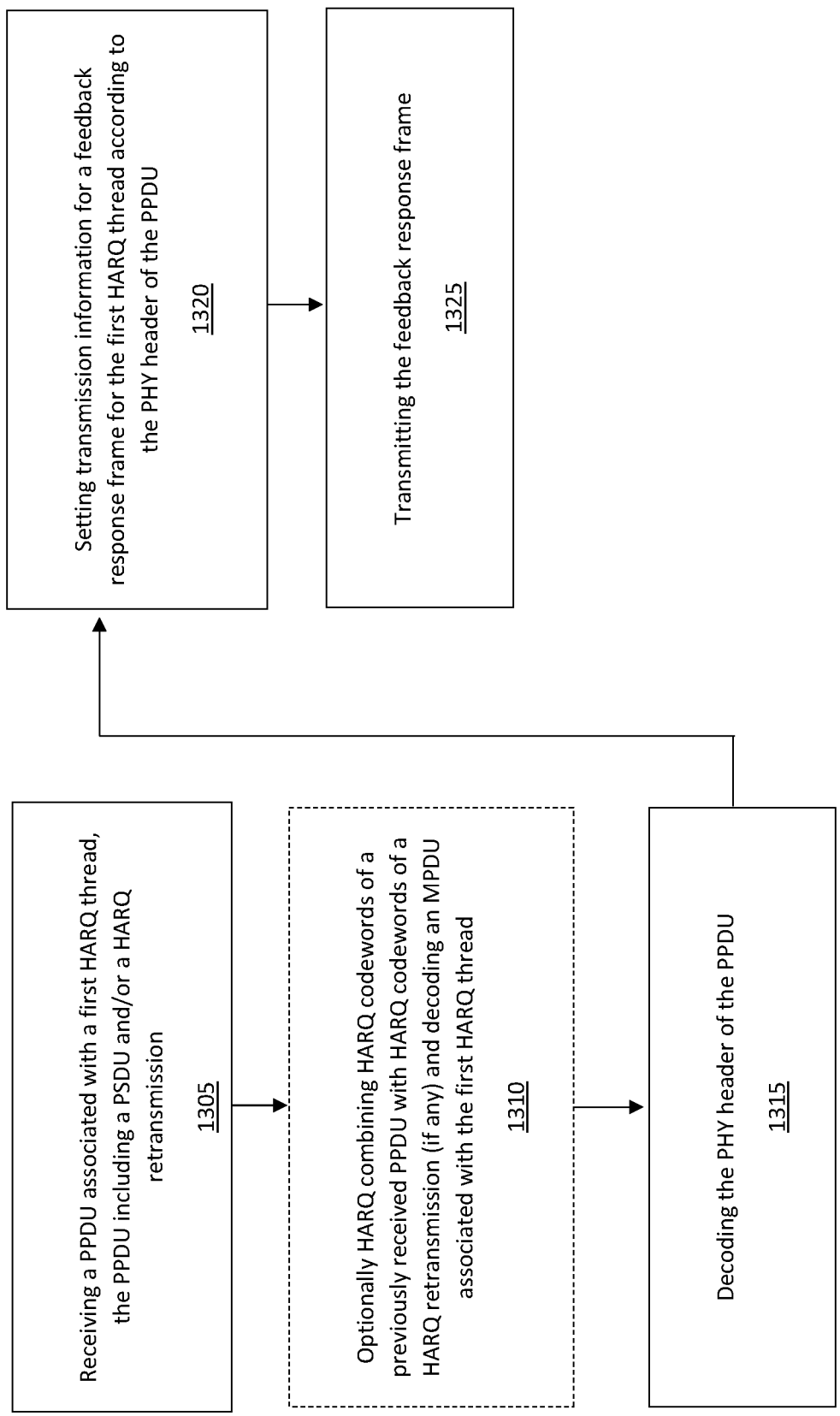
FIG. 13 is a flow chart depicting an exemplary sequence of computer implemented steps for performing feedback for a HARQ retransmission using a decoded PHY header according to embodiments of the present invention.

FIG. 13 is a flow chart depicting an exemplary sequence of computer implemented steps of a process 1300 for automatically providing a feedback response frame for a HARQ retransmission using a decoded PHY header according to embodiments of the present invention.

At step 1305, a PPDU is received. The PPDU can include a PHY header, a HARQ retransmission, and/or a PSDU. The HARQ retransmission and the PSDU (if present) are associated with different HARQ threads.

At step 1310, HARQ codewords of the HARQ retransmission are HARQ combined with HARQ codewords of a previously received PPDU.

At step 1315, a PHY header of the PPDU is decoded. The PHY header can include duration information and AP identification information, such as BSS Color, short BSSID, and non-AP STA identification information such as STA ID/AID, short STA MAC address, etc. The PHY header can also carry an UPLINK FLAG field to indicate uplink or downlink traffic. The RA and TA fields can be set based on the uplink/downlink indication and the AP identification information and non-AP STA identification information. For example, when the UPLINK FLAG indicates downlink traffic, the RA of the feedback frame is set to the AP identification, and the TA in the feedback frame is set to the non-AP identification. On the other hand, when the UPLINK FLAG indicates uplink traffic, the RA of the feedback frame is set to the non-AP identification, and the TA in the feedback frame is set to the AP identification.

At step 1320, transmission information is set for a feedback response frame for one or more HARQ threads according to the PHY header of the PPDU (e.g., the duration information, the RA, and the TA).

At step 1325, the feedback response frame is transmitted. The feedback can indicate correctly received PPDUS (BA), correctly received HARQ coding words or units (HARQ-ACK), or a NACK. A NACK can automatically trigger retransmission of the payload of the previously received PPDU.

Figure 14:
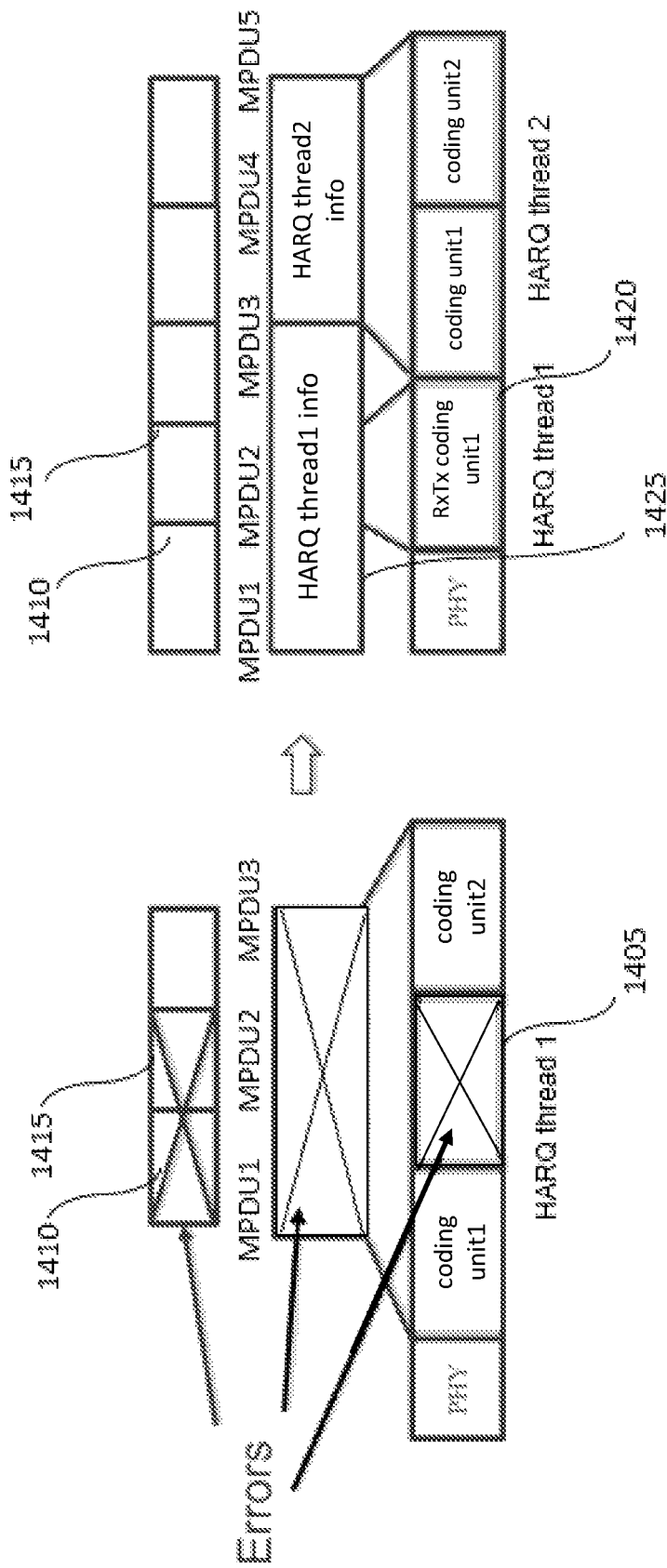
FIG. 14 is a block diagram depicting an exemplary HARQ operation performed by a TXOP responder using multiple HARQ threads according to embodiments of the present invention.

FIG. 14 depicts an exemplary HARQ operation 1400 performed by a TXOP responder using multiple HARQ threads according to embodiments of the present invention. Based on HARQ thread information (e.g., a HARQ bitmap or other information carried in a HARQ SIG field), a TXOP responder stores information bits of each ongoing HARQ thread until the HARQ thread ends. The TXOP responder replaces the information bit block (with error) using a retransmitted information bit block and decodes the MPDUs from the information bits for a specific HARQ thread. The TXOP responder can clear the buffer of information bits for a HARQ thread when the HARQ thread ends.

A HARQ thread ends when a HARQ thread condition is met as shown by Table I:
all MPDUs associated with the HARQ thread have been received correctly
all HARQ coding units are received with CRC check success;
the number of retransmissions reaches the maximum threshold for the HARQ thread;
the TXOP responder fell back to ARQ scheme for the HARQ thread;
the TXOP initiator flushes the HARQ thread with a new transmission; or
the TXOP ends Table I As depicted in FIG. 14, HARQ coding unit 2 1405 of HARQ thread 1 is received with error. MPSDU1 1410 and MPDU2 1415 are associated with HARQ thread 1 and HARQ coding unit 2 1405. Information bits of HARQ coding unit 2 1405 are retransmitted in HARQ coding unit retransmission 1420 (associated with HARQ thread 1). The TXOP responder replaces the information bits of HARQ thread 1 1425 for MPDU1 and MPDU2 using the retransmitted information 1420. MPDU1 1410 and MPDU2 1415 are decoded from the information bits for a HARQ thread 1 1425. The TXOP responder can clear the buffer of information bits for a HARQ thread 1 when HARQ thread 1 ends.

Exemplary Computer Controlled System

Embodiments of the present invention are drawn to electronic systems for performing HARQ data retransmission using multiple HARQ threads. The following discussion describes one such exemplary electronic system or computer system that can be used as a platform for implementing embodiments of the present invention. The exemplary computer system 1512 can be a wireless access point or a wireless station, for example. Exemplary computer system 1512 can stores information for a set of ongoing HARQ threads in a buffer (e.g., memory 1502 and/or 1503). The TXOP responder can replace information bit block (associated with a HARQ thread) that were received with error using a retransmitted information bit block, and can decode MPDUs from the information bits for the associated HARQ thread. The TXOP responder can clear the buffer of information bits for a HARQ thread when the HARQ thread ends. The TXOP initiator can aggregate multiple HARQ threads within a single PPDU. HARQ thread information can be transmitted in a HARQ SIG field. The HARQ thread information can include a HARQ thread bitmap or HARQ thread information index.

Transmission information such as duration information for PPDUs including BA/HARQ-ACK feedback such as RX/TX addresses, etc. can be determined according to previous transmission values of a received PPDU (e.g., values of a MAC or PHY header).

Figure 15:
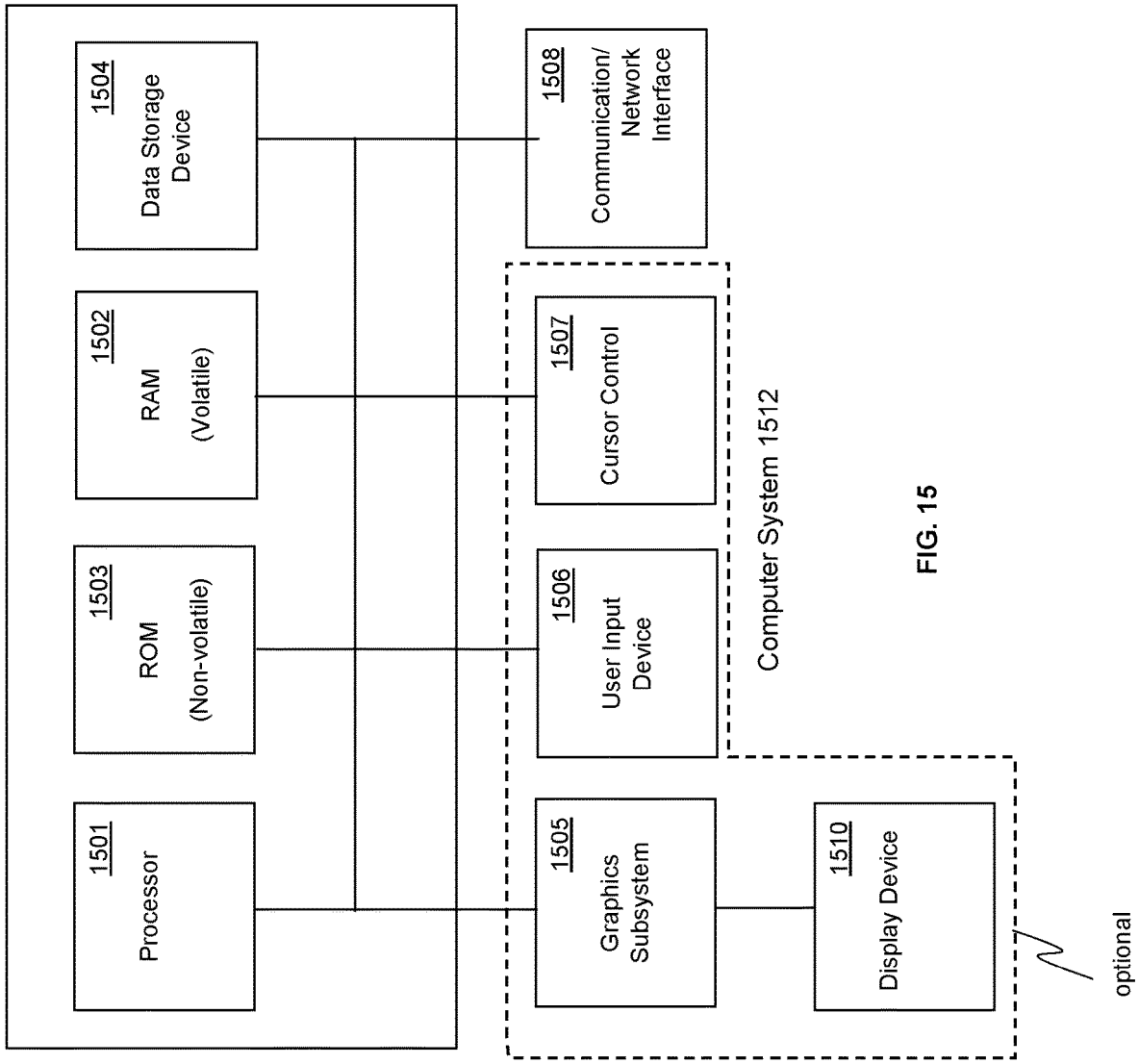
FIG. 15 is a block diagram depicting an exemplary computer system platform upon which embodiments of the present invention may be implemented.

In the example of FIG. 15, the exemplary computer system or wireless device includes a central processing unit (such as a processor or a CPU) 1501 for running software applications and optionally an operating system. Read-only memory 1502 and random access memory 1503 store applications and data for use by the CPU 1501. The processes depicted in FIGS. 12 and 13 can be stored as instructions in memory 1502/1503 and executed by processor 1501. Data storage device 1504 provides non-volatile storage for applications and data and may include fixed disk drives, removable disk drives, flash memory devices, and CD-ROM, DVD-ROM or other optical storage devices. The optional user inputs 1506 and 1507 comprise devices that communicate inputs from one or more users to the computer system 1512 (e.g., mice, joysticks, cameras, touch screens, and/or microphones).

A communication or network interface 1508 includes a plurality of transceivers and allows the computer system 1512 to communicate with other computer systems, networks, or devices via an electronic communications network, including wired and/or wireless communication and including an Intranet or the Internet (e.g., 802.11 wireless standard). According to embodiments of the present invention, the communication or network interface 1508 can operate multiple transceivers simultaneously. The communication or network interface 1508 can further include a cooperative management unit for coordinating the data sent and/or received by the transceivers.

The optional display device 1510 may be any device capable of displaying visual information in response to a signal from the computer system 1512 and may include a flat panel touch sensitive display, for example, and may be remotely disposed. The components of the computer system 1512, including the CPU 1501, memory 1502/1503, data storage 1504, user input devices 1506, and optional graphics subsystem 1505 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of data transmission in a wireless network using a plurality of hybrid automatic repeat request (HARQ) threads, the method comprising:
   receiving a first Physical Layer Convergence Procedure (PLCP) Protocol Data Unit (PPDU);
   receiving a second PPDU comprising a HARQ retransmission for the first PPDU, wherein the HARQ retransmission comprises a plurality of HARQ threads;
   performing HARQ combining to decode a MAC header and a PHY header using the plurality of HARQ threads;
   setting a duration information field in a MAC header of a feedback response frame according to a duration subfield in the PHY header decoded using the plurality of HARQ threads: and
   transmitting the feedback response frame.

2. The method of claim 1, further comprising setting a transmitter address (TA) field and a receiver address (RA) field in a MAC header of the feedback response frame according to the MAC header decoded from a HARQ thread of the plurality of HARQ threads.

3. The method of claim 1, further comprising setting a transmitter address (TA) field and a receiver address (RA) field in a MAC header of the feedback response frame according to the PHY header of the PPDU.

4. The method of claim 1, further comprising deducting a transmission time of the PPDU to set the duration information field in the MAC header of the feedback response frame.

5. The method of claim 4, further comprising deducting a short interframe space (SIFS) time to set the duration information field in the MAC header of the feedback response frame.

6. A method of data transmission in a wireless network using a HARQ thread, the method comprising:
   receiving a Physical Layer Convergence Procedure (PLCP) Protocol Data Unit (PPDU) comprising:
   a PHY header; and
   a HARQ retransmission comprising a first HARQ thread;
   using HARQ combining to decode a Media Access Control (MAC) Protocol Data Unit (MPDU) associated with the first HARQ thread;
   decoding the PHY header of the PPDU; and
   setting a duration information field in a MAC header of a feedback response frame according to duration subfields in the PHY header.

7. The method of claim 6, wherein the feedback response frame comprises a NACK frame that indicates a negative acknowledgement of the previously received payload.

8. The method of claim 7, further comprising determining that the MPDU associated with the first HARQ thread is not decoded, wherein the NACK frame comprises a HARQ thread bitmap indicating the first HARQ thread, a NACK field, and a HA Type field.

9. The method of claim 7, wherein the PPDU further comprises a PLCP Service Data Unit (PSDU) comprising a second HARQ thread.

10. The method of claim 9, further comprising determining that no MPDU associated with the second HARQ thread is decoded, wherein the NACK frame comprises a HARQ thread bits ap indicating the second HARK thread, a NACK field, and a HA Type field.

11. The method of claim 9, wherein the feedback response frame comprises a block acknowledgment (BA) comprising a BA control subfield value indicating NACK for all HARQ threads of the PPDU.

12. The method of claim 6, further comprising transmitting the feedback response frame indicating received coding units of the first HARQ thread.

13. The method of claim 6, further comprising setting a transmitter address (TA) field and a receiver address (RA) field in a MAC header of the feedback response frame according to the PHY header of the PPDU.

14. A device for transmitting data in a wireless network, the device comprising:
a transceiver configured to send and receive data on the wireless network;
a memory for storing received PPDUs; and
a processor operable to cause the transceiver to:
receive a PPDU comprising:
a PHY header; and
a HARQ retransmission comprising a first HARQ thread;
HARQ combine HARQ codewords of a previously received PPDU stored in the memory with HARQ codewords of the HARQ retransmission for decoding an MPDU associated with the first HARQ thread;
decode the header of the PPDU; and
set a duration information field in a MAC header of a feedback response frame according to duration subfields in the PHY header.

15. The device of claim 14, wherein the setting transmission information for the feedback response frame comprises:
setting a transmitter address (TA) field and a receiver address (RA) field in a MAC header of the feedback response frame according to the PHY header of the PPDU; and
setting a duration information field in the MAC header of the feedback response frame according to the PHY header of the PPDU.

* * * * *